S. V. BARNETT & J. W. HOLLOWAY.
CORN HARVESTER.
APPLICATION FILED APR. 1, 1916.
1,227,235.
Patented May 22, 1917.
5 SHEETS—SHEET 5.
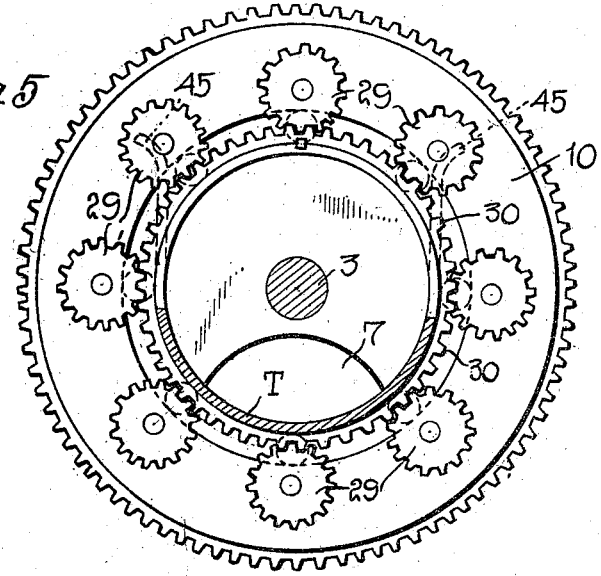
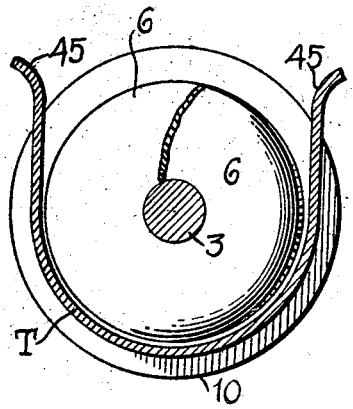
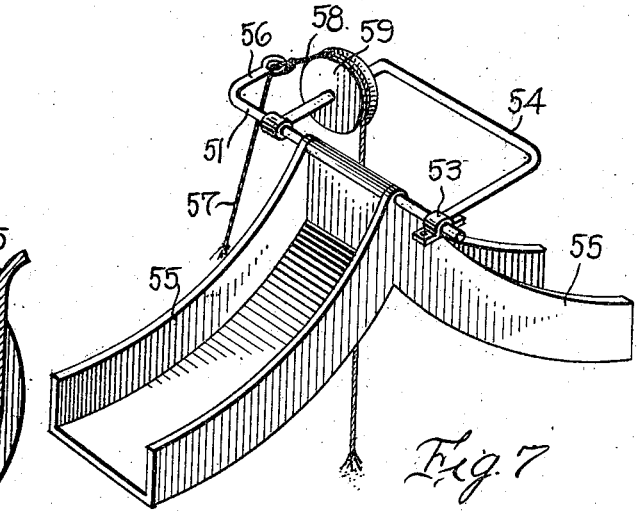
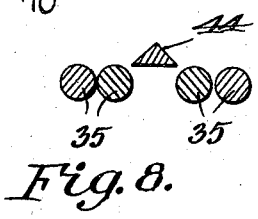
Inventors
SOLOMON V. BARNETT
JOHN W. HOLLOWAY
By Watson E. Coleman
Attorney

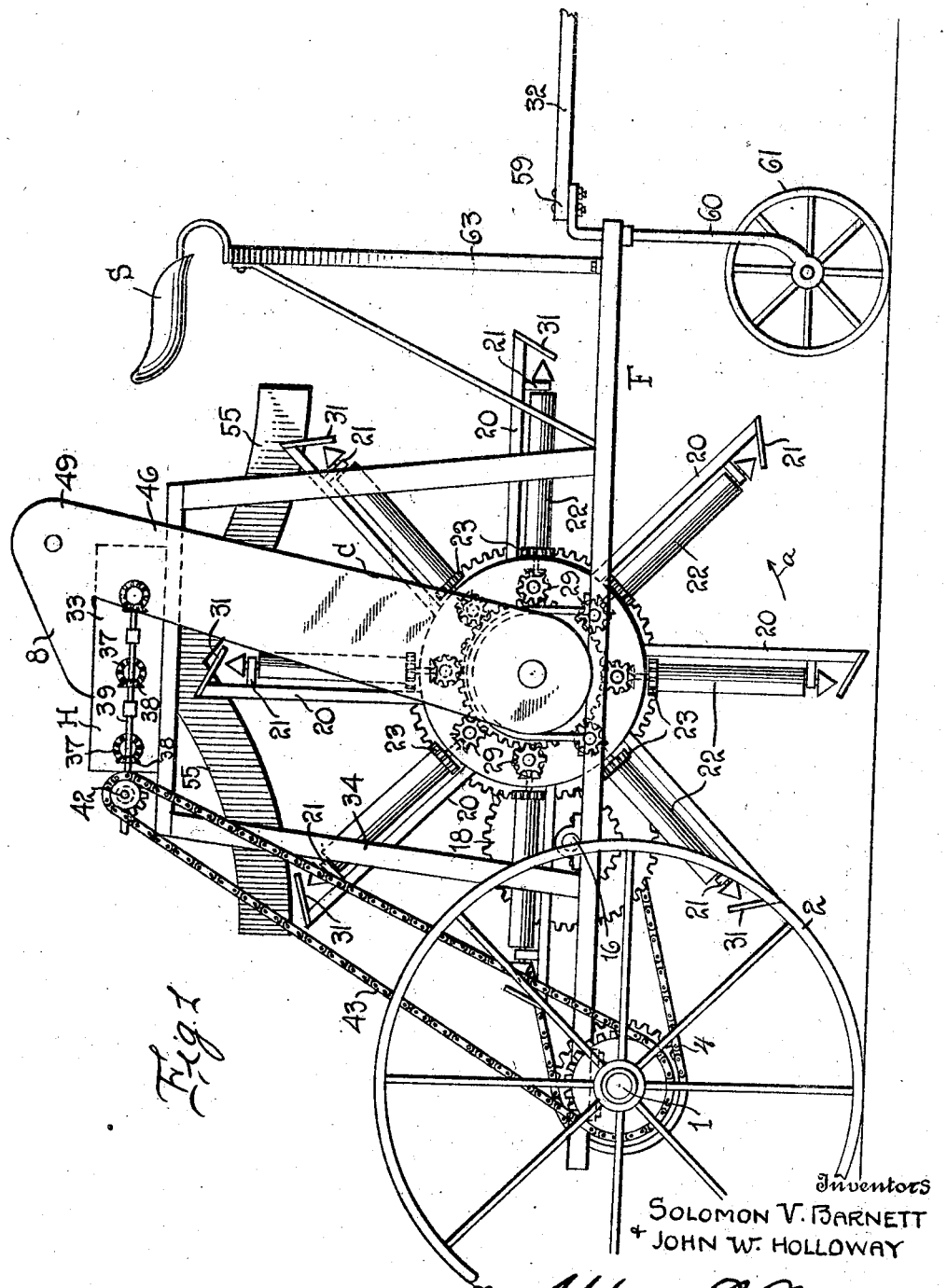

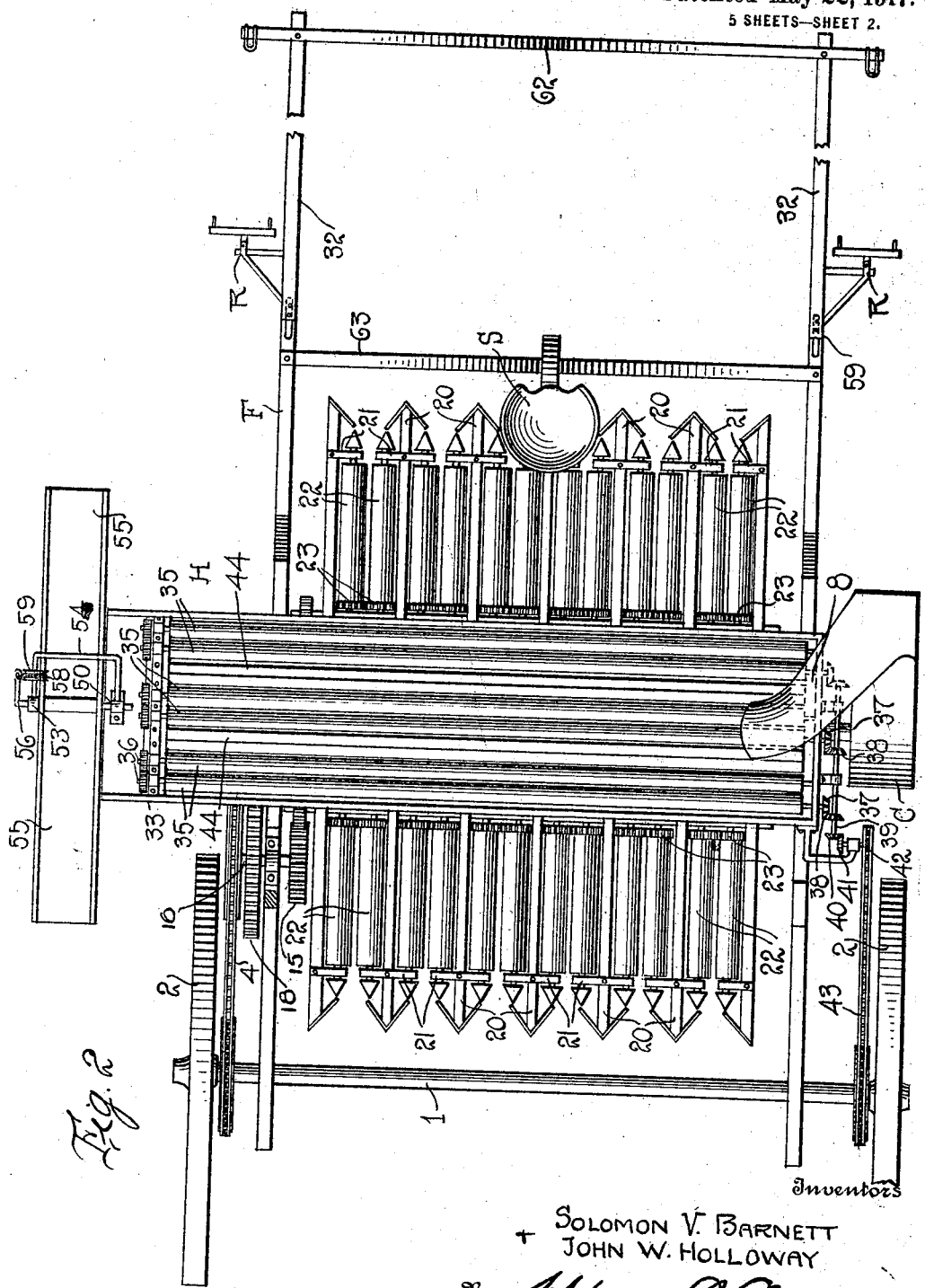

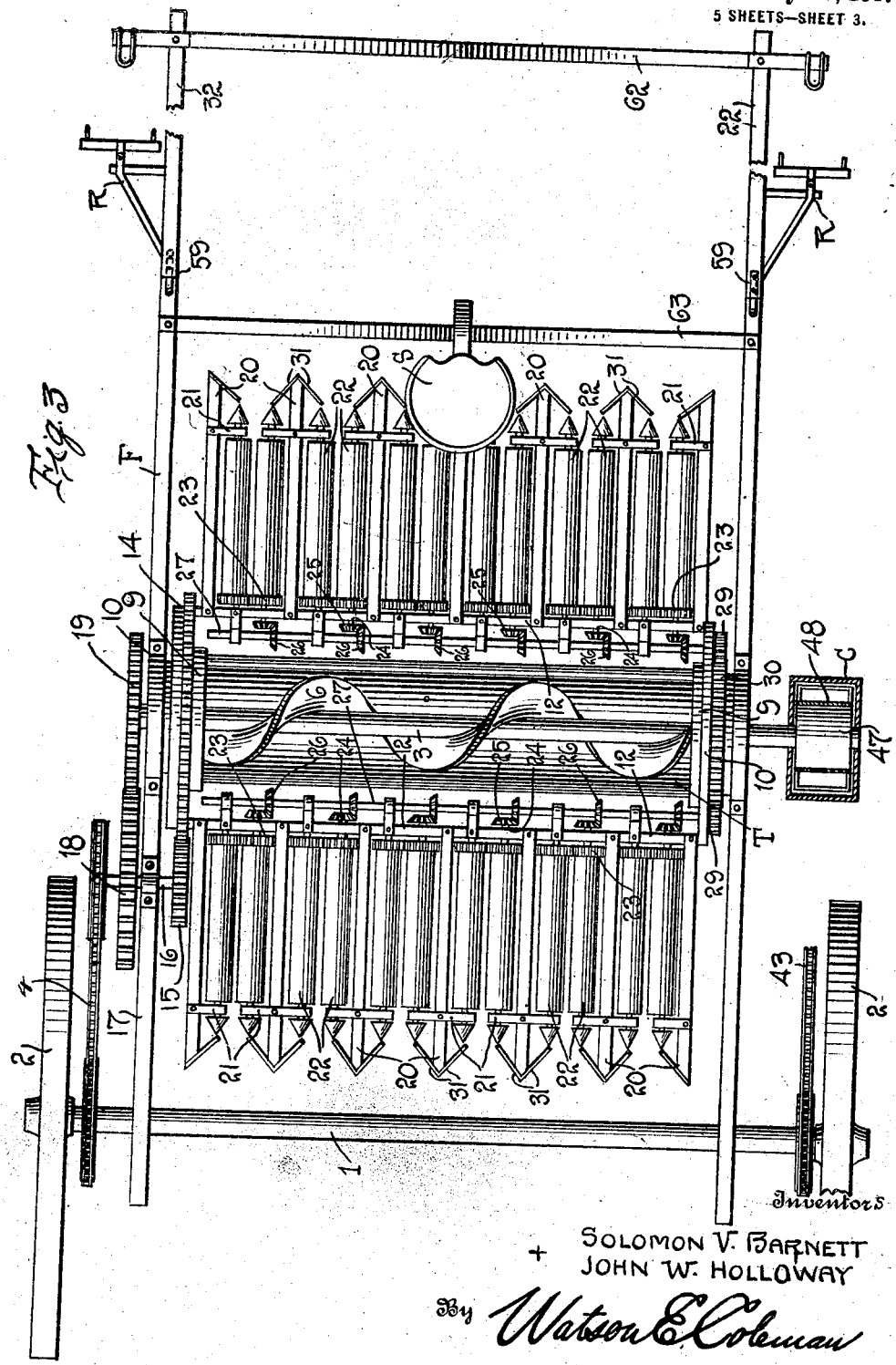

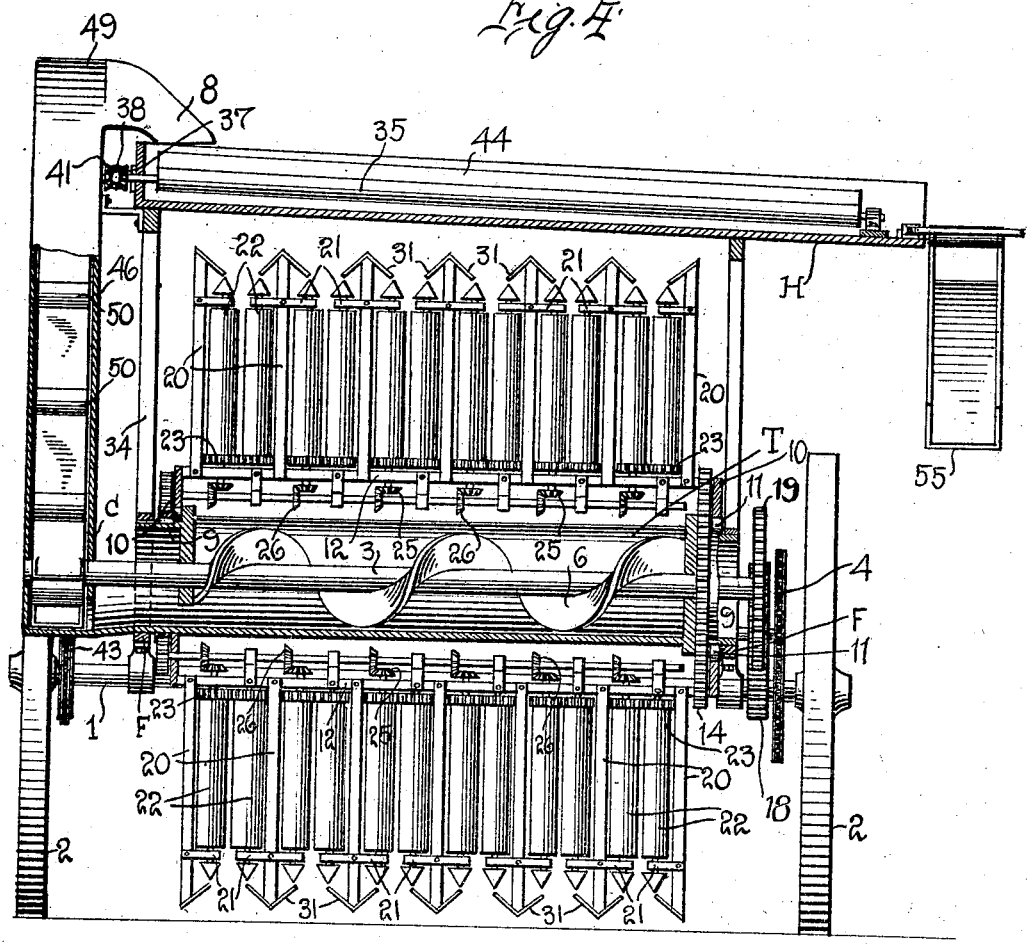

UNITED STATES PATENT OFFICE.

SOLOMON V. BARNETT AND JOHN W. HOLLOWAY, OF PRAGUE, OKLAHOMA.

CORN-HARVESTER.

1,227,235.     Specification of Letters Patent.     Patented May 22, 1917.

Application filed April 1, 1916. Serial No. 88,347.

*To all whom it may concern:*

Be it known that we, SOLOMON V. BARNETT and JOHN W. HOLLOWAY, citizens of the United States, residing at Prague, in the county of Lincoln and State of Oklahoma, have invented certain new and useful Improvements in Corn-Harvesters, of which the following is a specification, reference being had to the accompanying drawings.

This invention relates to certain improvements in corn harvesters and it is an object of the invention to provide a device of this general character having novel and improved means whereby the ears may be stripped from the standing stalks.

It is also an object of the invention to provide a novel and improved device of this general character wherein the ears after being stripped from the stalks are collected and conveyed to a husking mechanism and from which mechanism the corn is discharged within a barge or other vehicle accompanying the harvester.

Furthermore it is an object of the invention to provide a novel and improved corn harvester of a portable type and wherein is employed a rotatable member moving in a direction reverse to the travel of the harvester and from which radiates a plurality of husking rolls driven from a movable part of the harvester and which are adapted to coact with the standing stalks.

The invention consists in the details of construction and in the combination and arrangement of the several parts of our improved harvester whereby certain important advantages are attained and the device is rendered simpler, less expensive and otherwise more convenient and advantageous for use, all as will be hereinafter more fully set forth.

The novel features of the invention will hereinafter be definitely claimed.

In order that our invention may be the better understood, we will now proceed to describe the same with reference to the accompanying drawings, wherein—

Figure 1 is a view in side elevation of a harvester constructed in accordance with an embodiment of our invention;

Fig. 2 is a view in top plan of the device as disclosed in Fig. 1;

Fig. 3 is a view partly in top plan and partly in section of the device as herein embodied, the husking mechanism being omitted;

Fig. 4 is a transverse vertical sectional view taken through the device as herein included; certain of the parts being shown in elevation;

Fig. 5 is an enlarged view partly in elevation and partly in section illustrating the means for rotating the stripping rolls;

Fig. 6 is a detail transverse sectional view taken through the trough as herein disclosed, and illustrating the spiral conveyer therein; and Fig. 7 is a fragmentary view in perspective of the distributing mechanism coacting with the discharge end of the casing of the husking mechanism.

As disclosed in the accompanying drawings, F denotes the main frame of our improved harvester of predetermined dimensions and having disposed transversely thereof adjacent its rear end the axle 1, to the opposite extremities of which are suitably affixed the supporting wheels 2.

Intermediate its length the frame F rotatably supports the transverse shaft 3; fixed to one end portion thereof is the gear 19 in mesh with the gear 18 carried by the shaft 16 disposed transversely of one of the side beams 17 of the frame F, and said shaft 3 is operatively connected, as at 4, with the axle 5, whereby it will be perceived that the shaft 3 will be caused to rotate upon the travel of the machine.

Suitably supported by the frame F is the transversely disposed trough T which underlies the shaft 3 and extends a predetermined distance thereabove, and the portion of the shaft 3 within the trough T is provided with the spiral blade 6 whereby the corn deposited within the trough T is conveyed through the discharge opening 7 produced in one end of the trough T and delivered within the conveyer C which conveys the corn upwardly and discharges the same through the spout 8 upon the husking mechanism H, to be hereinafter more particularly referred to.

The trough T is substantially cylindrical in form and has its upper portion open and the opposite ends of the trough T are provided with the annular extensions 9 and surrounding said annular extensions 9 are the annular members 10 coacting with the antifriction members 11, whereby it will be perceived that the members 10 may be readily rotated around the extensions 9 independently of the trough T. The peripheral portions of the annular members 10 are connected by the bars 12 disposed longitudinally of the shaft 3 and in predetermined radial spaced relation, said bars 12 being for a purpose to be hereinafter more particularly referred to.

One of the annular members 10 is provided with the teeth 14 adapted to mesh with the gear 15 affixed to the shaft 16, whereby it will be perceived that the annular members 10 and the bars 12 will be caused to rotate in a direction opposite to the direction of travel of the machine, as indicated by the arrow $a$ in Fig. 1, and in unison with the shaft 3.

Extending outwardly from each of the bars 12 and radially disposed relative to the shaft 3 are the arms 20 spaced longitudinally of the bar and having their outer end portions provided with the bearings 21 for the outer ends of the stripping rolls 22, the inner end of said rolls 22 being rotatably supported by the bar 12. It is to be noted that the stripping rolls 22 are so related as to be assembled in pairs and as the machine advances, the stalks are adapted to pass therebetween and the upward movement of said rolls serve to strip the stalks of the ears thereon.

The inner extremities of each pair of stripping rolls 22 are operatively connected, as at 23, so as to rotate in unison but in reverse directions, and the inner end of one of said rolls 22 is provided with the stub shaft or trunnion 24 which extends through the bar 12 and is provided with the bevel-gear 25 in mesh with the bevel-gear 26 affixed to a shaft 27 disposed longitudinally of the bar 12 and rotatably supported by the inwardly directed bearings 28 carried thereby. One extremity of the shaft 27 extends beyond one of the annular members 10 and has affixed thereto the gear 29 in mesh with the stationary gear 30 suitably secured to the frame F, whereby it will be perceived that upon rotation of the annular members 10 the shaft 27 will be caused to rotate in order to impart the requisite relative rotation to each pair of stripping rolls 22.

The outer ends of the arms 20 are provided with the guiding fingers 31 disposed inwardly of the spaces between adjacent arms 20, whereby it will be perceived that the standing stalks will be guided between the pairs of stripping rolls 22.

33 denotes the casing comprised in the husking mechanism H as herein embodied and is disposed transversely of the frame F on a predetermined incline and is positioned a predetermined distance above the frame F and supported in said position through the medium of the uprights 34 carried by the side beams 17 of the frame F, and disposed longitudinally of the casing 33 are the pairs of husking rollers 35 having adjacent extremities operatively connected, as at 36, whereby the rollers of each pair will rotate in unison but in reverse directions. The shaft of one of the rollers 35 has affixed thereto a bevel-gear 37 in mesh with a bevel-gear 38 affixed to a shaft 39 disposed transversely of the casing 33 at its upper end, and said shaft 39 is provided with a bevel-gear 40 in mesh with a similar gear 41 carried by the inner extremity of the shaft 42 disposed longitudinally of the casing 33 and which is operatively connected, as at 43, with the axle 1, whereby it will be perceived that the husking rollers 35 will be caused to rotate upon the travel of the machine.

Interposed between each pair of husking rollers 35 and disposed longitudinally of the casing 33 are the strips 44 which serve to properly guide the ears to the pairs of husking rollers 35 in order to assure the proper husking of the ears.

It will be perceived that as the rolls 22 strip the ears from the standing stalks the same will be deposited within the trough T through the open top thereof when the rollers assume substantially a vertical position and in order to facilitate the entrance of the ears within the trough T, it is to be noted that the longitudinal margins of the open portion of the trough are flared outwardly, as indicated at 45. The ears deposited within the trough T are conveyed to the conveyer C through the medium of the spiral blade 6 and are then deposited upon the husking rollers 35. As herein embodied, the conveyer C comprises a suitably supported casing 46 having arranged in its lower part the drum 47 affixed to the shaft 3 which passes through the casing 46, and disposed around said drum 47 is the endless belt 48 which is also disposed around the idle pulley 49 positioned adjacent the upper end of the casing 46. The belt 48 is provided with the carriers 50 which are adapted to engage the ears as delivered within the lower portion of the casing 46 and carry the same upwardly.

Extending longitudinally from the discharge end of the casing 33 is a shaft 51 which is rotatably supported in the bearing 52 carried by the discharge end of the casing and in the bearing 53 carried by the outer end of the bracket 54 also suitably secured to the casing 33. Affixed to the shaft 51 and underlying the discharge end of the casing 33 are the oppositely directed distributing chutes 55 which serve to deliver the husked corn within a barge or other vehicle traveling with the harvester, and in order that the distributing chutes 55 may be adjusted in order to properly fill the barge or vehicle, the outer end of the shaft 51 is provided with the rock arm 56 to which is secured the flexible member 57 leading to the seat of the barge or vehicle, and also secured to the rock arm 56 is a second flexible member 58 which passes around the guide pulley 59 rotatably supported by the bracket 54 and then extending to the seat of the barge or vehicle. It will be perceived that upon proper manipulation of the flexible members 57 and 58, the distributing chutes 55 may be adjusted in accordance with the necessities of practice.

While the device may be caused to travel in any desired manner, we prefer to employ draft animals and for this purpose we provide the forward end of the machine with the poles 32 to the outer sides of which are secured the draft-riggings R. As herein embodied, the inner end of each of the poles 32 is operatively engaged, as at 59, with the upper angular portion of the standard 60 of a conventional caster wheel 61. The forward extremities of the poles 32 are tied or connected by the neck yoke or beam 62 while the forward ends of the side beams of the frame F are tied or connected by the arched member 63 with which the seat structure S of conventional form is operatively engaged. It is also to be noted that the beam or yoke 62 is also arched.

From the foregoing description, it is thought to be obvious that a harvester constructed in accordance with our invention is of an extremely simple and comparatively inexpensive nature and is particularly well adapted for use by reason of the convenience and facility with which it may be assembled, and it will also be obvious that our invention is susceptible of some change and modification without material departure from the principles and spirit thereof and for this reason we do not wish to be understood as limiting ourselves to the precise arrangement and formation of the several parts herein shown in carrying out our invention in practice.

We claim:

1. A corn harvester comprising a frame, a trough, a member revolving around the trough, ear stripping members radiating from the revolving member and adapted to discharge within the trough when in substantially a vertical position, and means for rotating the revolving member.

2. A corn harvester comprising a frame, a trough supported thereby, said trough being provided with annular portions in predetermined spaced relation longitudinally of the trough, a revolving member rotatably engaged with the annular portions of the trough and bridging the space between said annular portions, ear stripping members radiating from the revolving member and discharging within the trough, and means for rotating the revolving member.

3. A corn harvester comprising a frame, a trough, a member revolving around the trough, ear stripping members radiating from the revolving member and adapted to discharge within the trough when in substantially a vertical position, means for rotating the revolving member, and a conveyer within the trough discharging at one side of the frame.

4. A corn harvester comprising a frame, a trough, a member revolving around the trough, ear stripping members radiating from the revolving member and adapted to discharge within the trough when in substantially a vertical position, and means for rotating the revolving member upward and backward.

5. A corn harvester comprising a frame, a trough, a member revolving around the trough, ear stripping members radiating from the revolving member and adapted to discharge within the trough when in substantially a vertical position, means for rotating the revolving member, said stripping members including a plurality of pairs of coacting rollers, and guide members coacting with the outer ends of the rollers.

6. A corn harvester comprising a frame, a trough carried thereby and provided with annular portions, members rotatable about said annular portions, bars disposed longitudinally of the trough and connecting the members, ear stripping means carried by the bars, and means for revolving said members and bars around the trough.

7. A corn harvester comprising a frame, a trough, a member revolving around the trough, rotatable stripping members radiating from the revolving member and adapted to discharge within the trough when in substantially a vertical position, and means for rotating the revolving member.

8. A corn harvester comprising a frame, a trough, a member revolving around the trough, rotatable stripping members radiating from the revolving member and adapted to discharge within the trough when in substantially a vertical position, means for rotating the revolving member, and means operated by the revolving member for rotating the stripping members.

9. A corn harvester comprising a frame, a trough, a member revolving around the trough, ear stripping means carried by the revolving member and adapted to discharge within the trough, and means for rotating the revolving member.

10. A corn harvester comprising a frame, a trough provided with a discharge, a member revolving around the trough, ear stripping means carried by the revolving member and delivering within the trough, means for rotating the revolving member, and an elevating means coacting with the discharge of the trough.

In testimony whereof we hereunto affix our signatures in the presence of two witnesses.

SOLOMON V. BARNETT.
JOHN W. HOLLOWAY.

Witnesses:
GUS R. SUTTON,
W. E. AMBUSTER.